Feb. 9, 1954 H. M. OLSON 2,668,567
MOTOR-DRIVEN RECIPROCATING SAW UNIT
Filed May 31, 1949 2 Sheets-Sheet 1

INVENTOR
HOLLY M. OLSON
BY Liverance and
Van Antwerp
ATTORNEYS

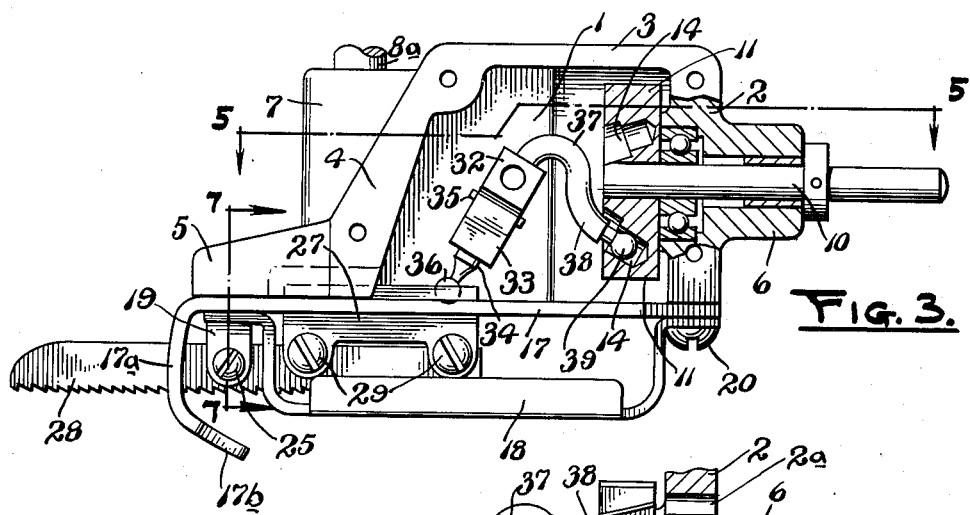
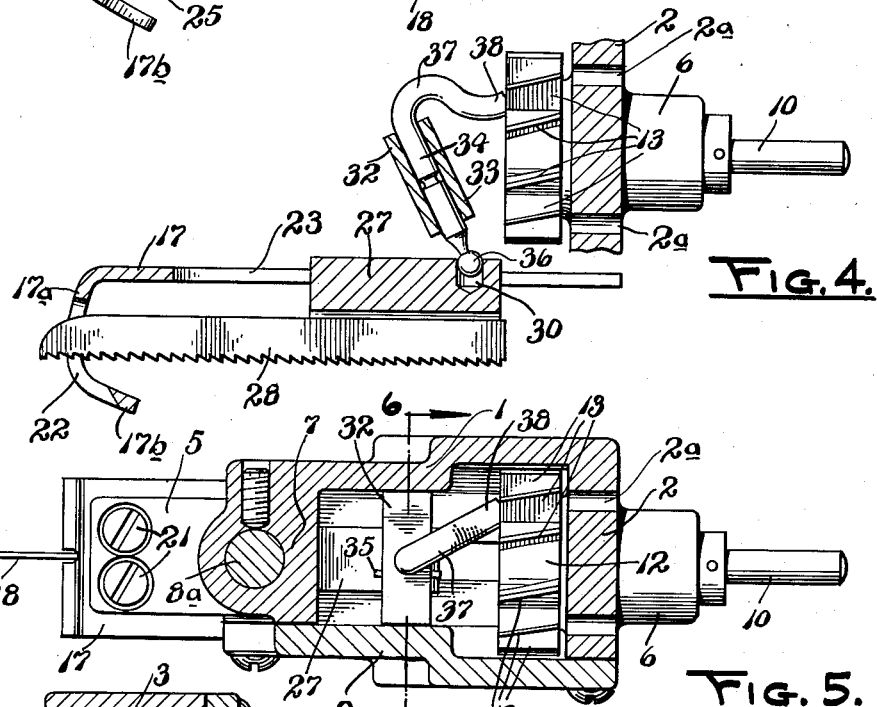
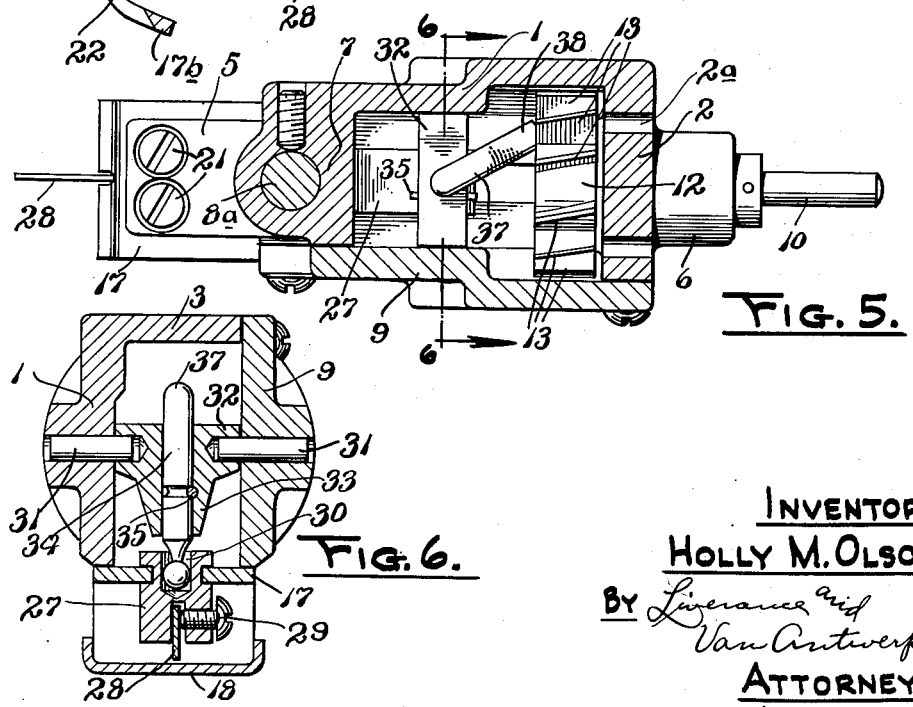

Patented Feb. 9, 1954

UNITED STATES PATENT OFFICE 2,668,567

MOTOR-DRIVEN RECIPROCATING SAW UNIT

Holly M. Olson, Muskegon, Mich.

Application May 31, 1949, Serial No. 96,308

5 Claims. (Cl. 143—68)

This invention relates to a motor driven saw unit, and more generally, a motor driven reciprocating drive of a processing member, of which a saw is one example, it being understood that for the saw which is moved back and forth in the direction of its length, other processing members as a substitute therefor may be used without changing or departing from the invention.

It is an object and purpose to provide a very compact, light weight processing unit which, as I have built the invention, is in connection with a saw, and drives the saw very rapidly by direct connection to an electric motor, and in practice by direct connection to an electric motor of a hand drill in which a drill is detachably connected by a chuck or other similar means with the shaft of the motor, which in turn is housed within a housing having a hand grip. By means of the drill holes may be very rapidly drilled at substantially any angle desired, the hand engageable drilling unit being directed by the hands of the operator so as to drill a hole at any place accessible by the drill.

With my invention a particularly simple, novel and practical mechanism is used for converting the rotary movement of the electric motor of such drill unit to a reciprocating movement, the drill connecting chuck of the motor driven drill unit being readily attached to a driven shaft forming a part of the reciprocating unit, and with which a saw or other processing member or tool may be connected for sawing or other operations.

It is a further object of the invention to provide a novel, very simple and practical and durable mechanism for converting the rotary to the reciprocating movement and which will work effectively at very high speeds of rotation of the motor. Such motors may drive at 1800 R. P. M. or at twice such speed of rotation or more; and with my invention, with each rotation of the motor shaft, a complete reciprocation of the saw or other processing tool takes place.

An understanding of the invention may be had from the following description, taken in connection with the accompanying drawing, in which:

Fig. 3 is a somewhat enlarged full size side elevation, with the cover plate at one side of the unit housing removed, and with some parts shown in vertical section for better disclosure.

Fig. 4 is a fragmentary side elevation and partial section of the change direction mechanism by means of which the rotary is converted to the reciprocatory movement.

Fig. 5 is a horizontal section substantially on the plane of line 5—5 of Fig. 3 looking downwardly.

Fig. 6 is a transverse vertical section substantially on the plane of line 6—6 of Fig. 5.

Like reference characters refer to like parts in the different figures of the drawings.

Figure 1:
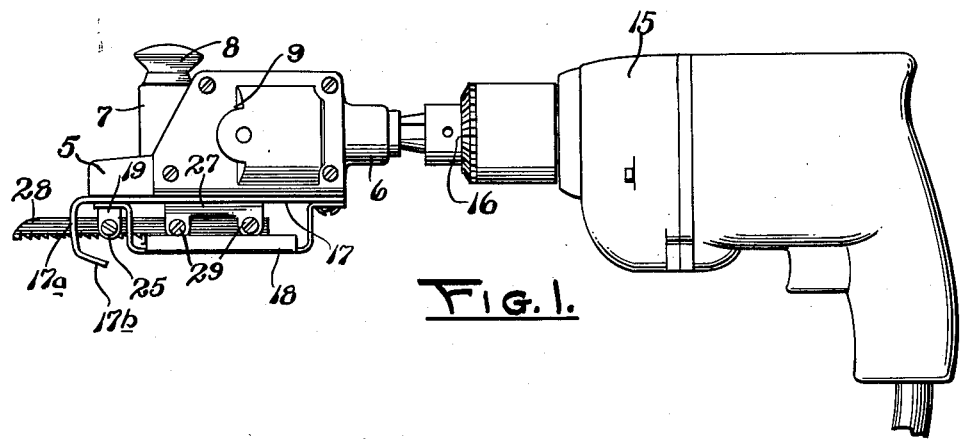
Fig. 1 is an elevation showing the motor saw unit of my invention operatively attached to the spindle of a motor driven drill unit.

In the structure of the sawing unit illustrated, a housing is used, having vertical side 1, a vertical back 2 through which air passing openings 2a are made, a horizontal top 3 and a downwardly or forwardly inclined front 4 at the lower end portion of which a lug 5 extends in a forward direction. Such parts of the housing are integral and from the back 2 a bearing boss 6 extends to the rear, while at the front of the inclined front member 4 a thickened boss 7 is integrally cast for the attachment of a knob 8, by means of a short shaft 8a extending therefrom downwardly into the boss 7, and secured by a set screw (Fig. 5). The other side of the housing is open and in practice is closed by a second vertical, removable side 9 which is detachably secured in place by screws, as shown.

Figure 8:
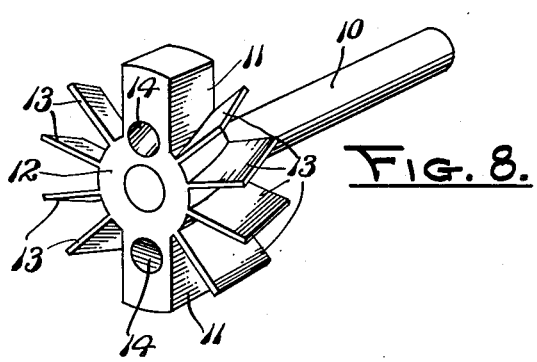
Fig. 8 is a perspective view of an element of the structure, including the motor driven shaft and the head thereon which operates the reciprocating mechanism, together with fan vanes for blowing air for the purpose of removing sawdust during a sawing operation.

A horizontal shaft 10 passes through the boss 6 and is mounted by means of suitable bearings for rotation. Within the housing, at the front side of the rear member 2 of such housing a head is secured which, as best shown in Fig. 8, comprises two diametrically opposed relatively heavy arms 11 cast integral with a central hub 12. From the hub 12, at opposite sides thereof and between the arms 11, vanes 13 extend outwardly which are positioned in planes inclined to the axis of the shaft 10. In each of the arms 11 at its inner side an opening or recess 14 is drilled or otherwise provided. The axes of such openings are inclined to the axis of the shaft 10 (Fig. 3), and at their outer end portions are enlarged in diameter as shown. The shaft 10 is adapted, where it extends back of the boss 6, to be detachably connected to the drill carrying shaft of a motor driven hand drill 15, the chuck 16 which receives the end of the drill spindle being adapted to be detachably secured to the projecting rear end of the shaft 10. Thus the head at the inner end of the shaft 10 is driven at the same speed of rotation as the armature of the motor.

Figure 7:
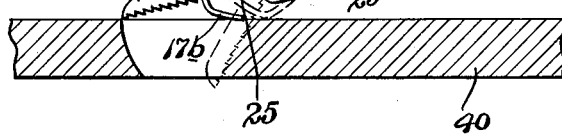
Fig. 7 is a similar transverse vertical section, on the plane of line 7—7 of Fig. 3.

The open under side of the housing is closed in the main by an elongated horizontal bar or plate 17 which, together with a guard 18 shaped as shown in Fig. 3, and a saw guide fixture 19, is secured by means of screws 20 and 21 in fixed relation to the housing. The ends of the guard lie underneath the bar 17 and at the rear ends of the guard and bar screws 20 pass upwardly through into the rear ends 2 of the housing. The front end of the guard 18 is underneath the front end portion of the bar 17, the saw guide fixture 19 is underneath it, and screws 21 (Figs. 5 and 7) pass downwardly through the lug 5 into the member 19 for securing the parts together. The front end portion of the bar 17 substantially at the front of the lug 5 is bent to extend downwardly as at 17a and then bent in an arc and extends as a terminal section 17b which is inclined to the horizontal as shown in Fig. 3.

The parts 17a and 17b of the bar 17 have an opening or slot 22 therein positioned generally in a vertical plane, the slot being closed at both ends. The bar 17 from its rear end, forwardly for the major portion of tis length, is slotted midway between its side edges to provide an elongated slot 23. The saw guide fixture 19 (Fig. 7) is slotted at its under side upwardly from front to rear, as indicated at 24, and two screws 25, which in the saw unit preferably are of brass or any other equivalent metal which will not scuff when in contact with a moving steel member, such as a saw blade, are threaded from opposite sides through the guide member 19 into the slot 24. At the top of the slot, a plate 26 is located, also of a suitable material which will not scuff or otherwise wear away. The reciprocating saw blade, which is hereafter described, is located between the inner ends of the screws 25 and at its upper edge may bear against the plate 26.

A saw carriage 27, substantially in the form of a bar rectangular in cross section, is slidably mounted on the bar 17 having opposed guide slots in its sides (Fig. 6), the carriage being movable back and forth in the slot 23. At the front and rear ends of the carriage 27, downwardly extending lugs are cast which are slotted upwardly between their sides for the reception of the rear portion of a saw blade 28, releasably clamped in place by screws 29. The saw blade 28 extends forwardly through a suitable slot in the guard 18, between the adjacent ends of the screws 25 and through the slot 22 in the front end portion of the bar 17 as shown in Fig. 4. In the upper side and near the rear end of the carriage 27 a vertical recess 30 is drilled.

The driving mechanism between the rotatable head at the inner end of the shaft 10 and the reciprocable carriage 27 includes a rocker, which is mounted to rock about the horizontal axis of two aligned supporting and bearing pins 31 (Fig. 6) mounted on and extending through the fixed side 1 and the removable side 9 of the housing, at their inner ends extending partly into the chamber within the housing. The rocker member includes a horizontal bar 32, substantially square in cross section, with openings at its ends to receive the projecting ends of the fixed pins 31, and a downwardly extending lug 33 integral with the bar 32. A bent rod having a straight section 34 passes downwardly through the bar 32 and the lug 33. Between its ends it has a groove around it (Fig. 6), and a pin 35 is driven through the lug 34 seating partly in the groove and partly in a groove in such lug so as to lock the straight section 34 against endwise movement, but permitting free turning or rocking movement thereof. The lower end of the section 34, below the lower end of the lug 33, is reduced in diameter and terminates in a cylindrical head or ball 36 which is received in the recess 30 of the carriage 27.

Above the upper side of bar 32 the rod is bent into a substantially semi-circular shape, as at 37, and thence continued in a reversely bent section 38, at the end of which is a reduced section terminating in a second spherical head or ball 39 adapted to enter a selected recess 14 in either one of the arms 11 of the rotatable head fixed at the inner end of the shaft 10. The two recesses or openings 14 are at different distances outwardly from the shaft 10, and the stroke or throw of the saw blade will be greater or less depending upon whether the ball 39 is in the farthest outward recess 14 or in the other or inner recess 14.

With the structure as described, and with the shaft 10 driven at high speed of rotation by the motor of a hand motor drill unit, the straight section 34 of the bent rod is rocked back and forth about its longitudinal axis and simultaneously the bar 32 with the depending lug 33 rocked back and forth about the horizontal axis of the pins 31. With each rotation of the shaft 10 the carriage 27 and the saw blade 28 fixed thereto make a complete reciprocation. Thus with the shaft driven at 3600 R. P. M. the saw blade 38 makes 3600 complete reciprocations per minute. The saw blade at its outer end always projects in all positions of it beyond the part 17a at the front portion of the carriage supporting and guide bar 17, and at its farthest front position the saw unit, which in Fig. 3 is shown in full size, projects a sufficient distance so that all lumber of a standard one inch thickness or less may be sawed through.

Figure 2:
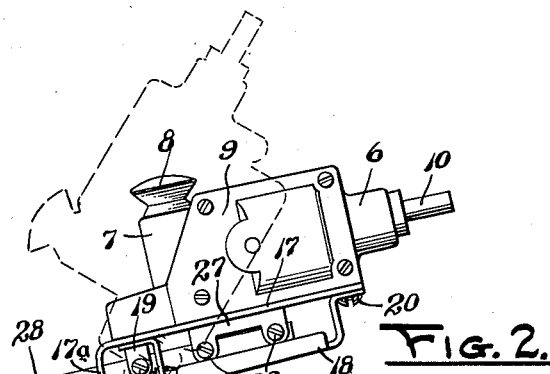
Fig. 2 is a similar side elevation of the saw unit of my invention and the manner in which it is used and at two extreme positions of the saw unit, one at the beginning of a sawing operation of a board, and the other the position when the board is being sawed entirely through it.

In the use of the motor saw unit (Fig. 2) the rearwardly and downwardly inclined terminal section 17b of the bar 17 rides as indicated at 40. The board may be started as to the sawing therein either at a free edge of it or between edges as indicated in Fig. 2, the unit being turned counterclockwise from its full line position in Fig. 2, to the dash line position. In such dash line position, the motor unit is supported at the bend between the two sections 17a and 17b. The operator may grasp the knob 8, for example with his left hand, and the handle at the rear end of the motor housing 16 with the other hand and guide the saw in any direction wanted either in straight or curved lines. It is apparent that not only may a board be sawed through from its upper to its lower side, but slots or kerfs of preselected depths may be cut from the upper side downwardly any selected distances wanted, with the bottoms of the kerfs short of the under side of the board.

The bearing portions of the parts 17b and of the bend between it and the section 17a may be hardened or supplied with wearing surfaces or members as wanted to withstand the wear which takes place upon extensive use. The rapid rotation of the vanes 13 on the hub 12 of the rotating head causes a current of air, drawn through the openings 2a in the rear end 2 of the housing, to be forced outwardly through the slot 23 in the plate 17 and blow sawdust, which is drawn upwardly to the upper surface of the board, out of the way so that a line which is to be followed in sawing is not covered up or otherwise obscured.

The saw unit described is of a particularly simple structure and one which will stand up and withstand the rather severe usage to which the sawing unit is subjected at its very high speeds of operation. The ball and socket joints between the bent bar and the saw carriage at one end, and the rotatable head at the other, permit the free and frictionless simultaneous rocking of the rocker bar 32 about its horizontal axis and of the bent bar about the longitudinal axis of the straight section 34 thereof without generation of heat so that the apparatus is exceptionally durable because of its extreme simplicity of structure. In operation in the size shown in full scale in Fig. 3, at which the unit has been constructed and used, it has not only operated in an exceptionally satisfactory manner, but perfectly.

It is of course to be understood that in a larger size, the saw blade 28 will be longer and extend out farther to the front for use in sawing standard lumber two inches in thickness or between one and two inches in thickness. It is a unit which is adapted to be used with motor driven hand drills which are very largely used. And while the saw has been described as a wood saw, metal may be also sawed by using a suitable hack saw for such purpose.

As earlier mentioned, the invention has been embodied using a saw as the tool to be operated thereby. It is apparent however that such conversion from rotary to reciprocatory movement may be useful in a great many other ways than in sawing, and the invention is not to be limited solely to sawing devices as disclosed, but is to be considered comprehensive of all forms of structure coming within the scope of the claims hereto appended.

I claim:

1. In a structure as described, a supporting housing having spaced parallel sides, a rocker member located between and mounted on said sides for rocking movement, a rod rotatively mounted on and extending through said rocker member at right angles to the rocking axis of said member, a shaft rotatively mounted on the housing and extending toward the rocker member, a head on said shaft having a recess in the side thereof adjacent the rocker member, said recess located outwardly from the center of said shaft, said rod at one end thereof including a laterally bent section extending toward said head and terminating in a ball located in said recess, a carriage, supporting and guide means for said carriage connected with sid supporting housing for supporting and guiding said carriage in back and forth reciprocating movements, and a universal joint connection between the opposite end of the rod and said carriage.

2. In a structure as described, a housing having a generally horizontal top, a vertical side, a vertical back and a generally vertical front, said top, back and front being integral, a second side parallel to the first side having means for detachable connection to close the housing except at its bottom, and said housing at its lower front portion having a forwardly extending lug integral therewith, a longitudinally slotted plate secured to and closing the lower side of the housing, a rotatable shaft mounted on and extending through said back, a head within the housing connected to the inner end of the shaft, a carriage slidably mounted for back and forth movements on said plate, a horizontally disposed rocker member extending between sides of the housing, means for mounting said rocker to rock about a horizontal axis, a rod having a straight section rotatively mounted on and extending downwardly through said rocker member, ball and socket connections between the lower end of said rod and the carriage, said rod at its upper portion having an integral generally inverted U-shaped portion extending rearwardly therefrom and terminating in a terminal section located at an acute angle to the axis of said shaft, said terminal section at its free end having an integral ball and said head having a recess to receive said ball, said recess being disposed at an acute angle to the axis of the shaft and located a distance outward from said axis.

3. A structure as defined in claim 2, said back having air passage openings therethrough and said head having air current inducing vanes thereon extending outwardly from and rotatable with the head for drawing air through said passages and forcing it outwardly at the lower front portion of said housing.

4. In a structure as described a housing having a top, front and rear ends and spaced vertical sides, means for detachably connecting one of said sides in place, a driven shaft rotatably mounted on and extending through the back of the housing, a supporting guide plate detachably secured at the under side of the housing across the open bottom thereof, a carriage mounted on said plate for back and forth movements thereon, a head at the inner end of said shaft, operative connections between said head and carriage, including a member mounted between the sides of the housing for rocking movement about a horizontal axis, and a bent rod passing through the rocking member and mounted to turn about an axis at right angles to the axis of rocking of said member, and universal joint connections at the ends of the rod with said head and carriage, for reciprocating the carriage one complete reciprocation with each rotation of the shaft and attached head.

5. In a structure as described, a supporting housing having spaced parallel sides, a rocker member located between and mounted on said sides for rocking movement, a rod rotatively mounted on and extending through said rocker member at right angles to the rocking axis of said member, a shaft rotatively mounted on the housing and extending toward the rocker member, a head on said shaft having a recess in the side thereof adjacent the rocker member, said recess being located outwardly from the center of said shaft, said rod at one end thereof including a laterally bent section extending toward said head and terminating in a ball located in said recess, a carriage, supporting and guide means for said carriage connected with said supporting housing for supporting and guiding said carriage in back and forth reciprocating movements, a universal joint connection between the opposite end of the rod and said carriage, air propelling vanes connected with said rotatable head for forcing air in a downward direction, and a plate closing the lower side of said housing, said plate having an air passing opening therethrough.

HOLLY M. OLSON.

References Cited in the file of this patent

UNITED STATES PATENTS

| Number | Name | Date |
|---|---|---|
| 519,682 | Randall | May 8, 1894 |
| 1,035,524 | Bradley | Aug. 13, 1912 |
| 1,592,999 | Williams | July 20, 1926 |
| 1,623,309 | Econom | Apr. 5, 1927 |
| 1,793,053 | Cahill et al. | Feb. 17, 1931 |
| 1,808,228 | Hulack et al. | June 2, 1931 |
| 2,355,602 | Testo | Aug. 8, 1944 |
| 2,455,626 | Traut | Dec. 7, 1948 |
| 2,457,829 | Miller | Jan. 4, 1949 |
| 2,488,947 | Vavrik | Nov. 22, 1949 |
| 2,488,998 | Turkowski | Nov. 22, 1949 |
| 2,548,411 | Vache | Apr. 10, 1951 |